US012566552B1

(12) United States Patent
Sinnamohideen et al.

(10) Patent No.: US 12,566,552 B1
(45) Date of Patent: Mar. 3, 2026

(54) MULTI-STREAM WRITE-AHEAD LOG OPTIMIZED FOR FLASH-BASED STORAGE DEVICES

(71) Applicant: VDURA, Inc., San Jose, CA (US)

(72) Inventors: Shafeeq Sinnamohideen, Pittsburgh, PA (US); Aliaksei Karaliou, Minsk (BY); Ian Davies, Longmont, CO (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 19/212,306

(22) Filed: May 19, 2025

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | | |
|---|---|---|---|---|
| 12,271,625 | B1 * | 4/2025 | Astolfi | ................. G06F 3/0656 |
| 2017/0300250 | A1 * | 10/2017 | Sterns | ................... G06F 3/0683 |
| 2023/0333756 | A1 * | 10/2023 | Mann | ................... G06F 3/0673 |

* cited by examiner

*Primary Examiner* — Nicholas A. Paperno
(74) *Attorney, Agent, or Firm* — Fenwick & West LLP

(57) ABSTRACT

A storage system is configured to manage a write-ahead log on a flash-based non-volatile storage device. The system divides the device's logical address space into multiple regions, each comprising a header portion with fixed-size record headers and a data portion for variable-length records. The system receives incoming write operations and temporarily stores them in the write-ahead log before flushing them to long-term storage. Metadata for each record is stored in the header portion, while the corresponding data is written to the data portion. The system enables concurrent writes by supporting partial overlap in write timing across records, improving throughput. By structuring log regions to align with physical erase blocks and enabling bulk erasure of obsolete regions, the system reduces write amplification and enhances flash-based non-volatile storage device endurance.

20 Claims, 12 Drawing Sheets

500

800

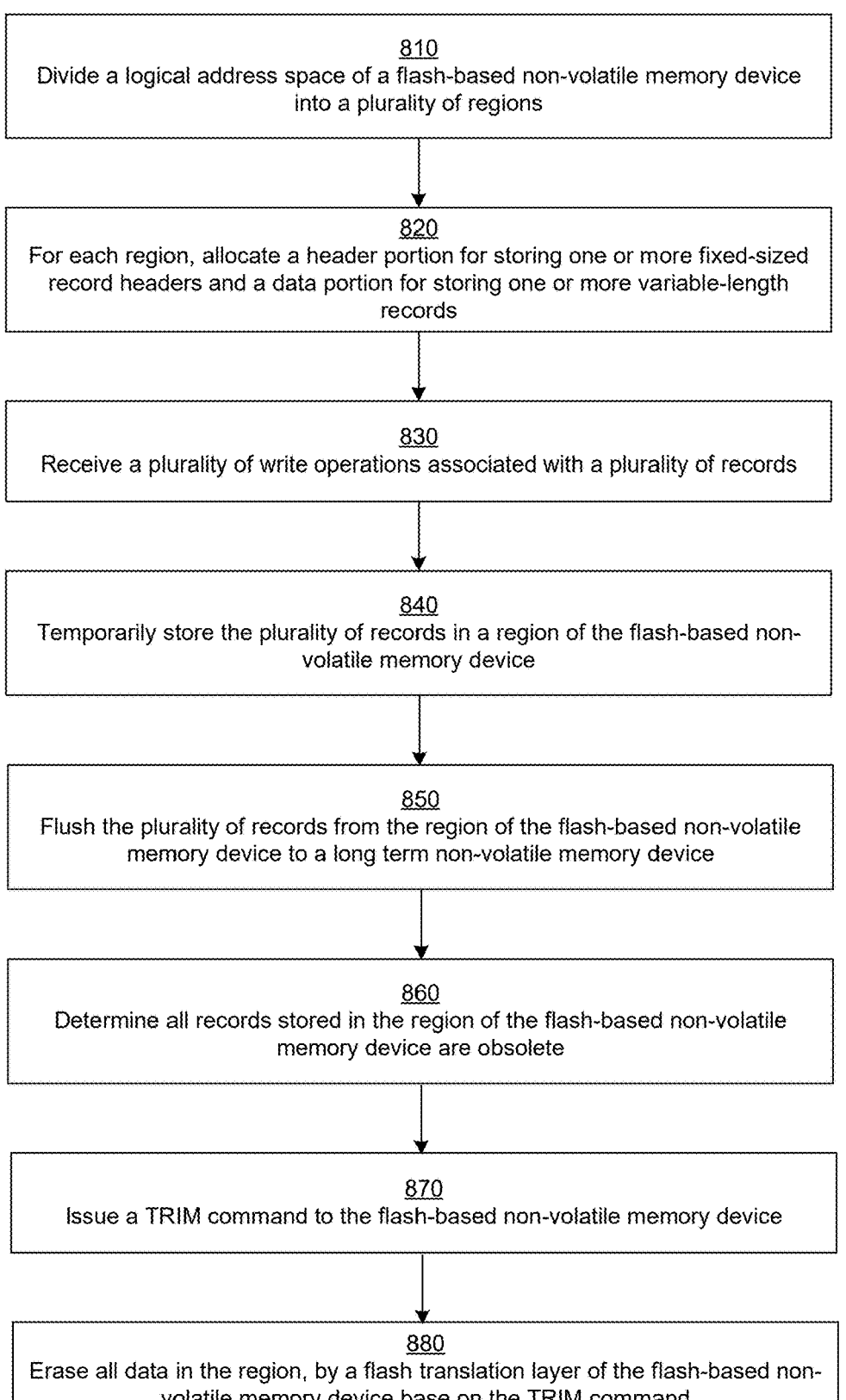

810
Divide a logical address space of a flash-based non-volatile memory device into a plurality of regions

820
For each region, allocate a header portion for storing one or more fixed-sized record headers and a data portion for storing one or more variable-length records

830
Receive a plurality of write operations associated with a plurality of records

840
Temporarily store the plurality of records in a region of the flash-based non-volatile memory device

850
Flush the plurality of records from the region of the flash-based non-volatile memory device to a long term non-volatile memory device

860
Determine all records stored in the region of the flash-based non-volatile memory device are obsolete

870
Issue a TRIM command to the flash-based non-volatile memory device

880
Erase all data in the region, by a flash translation layer of the flash-based non-volatile memory device base on the TRIM command

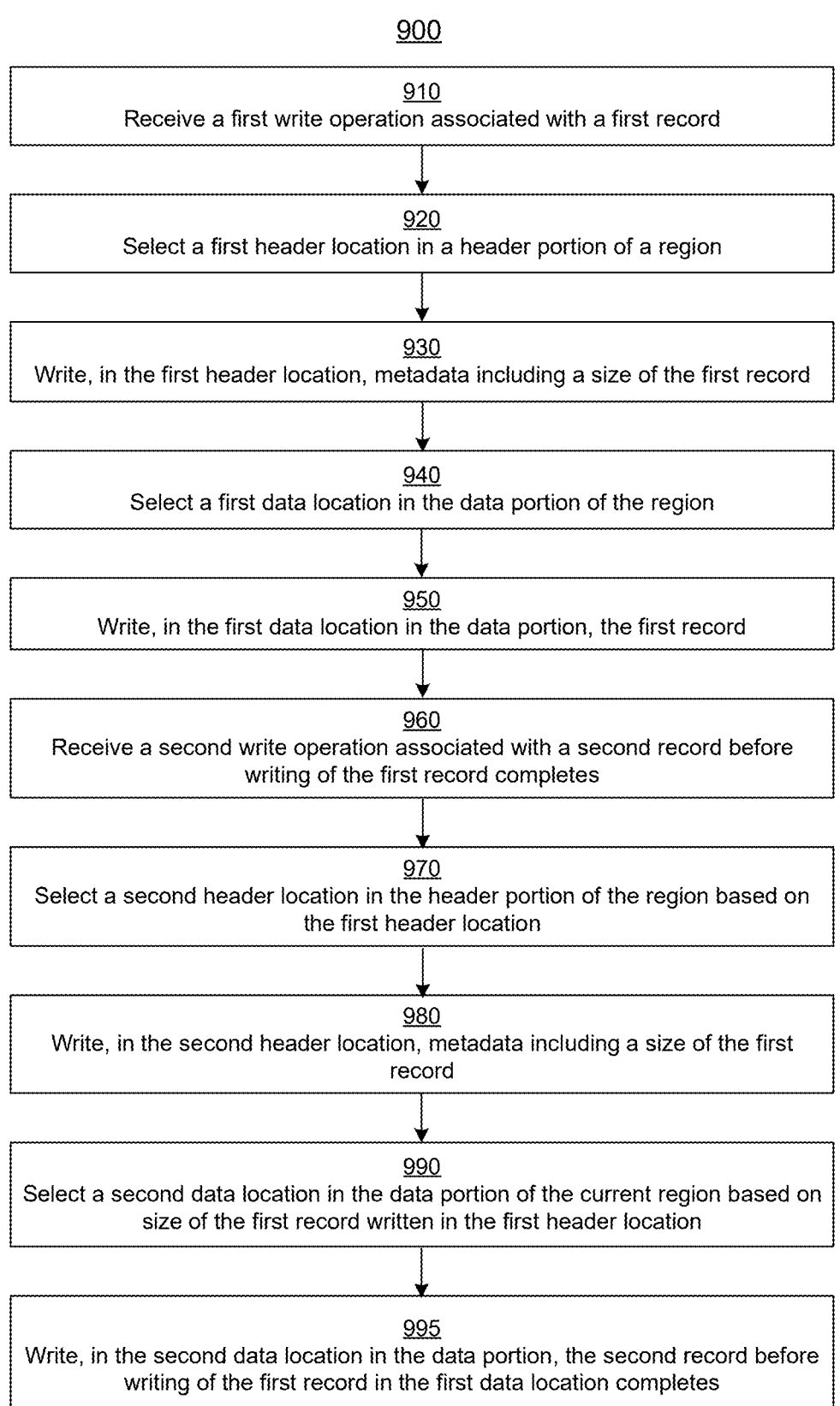

910
Receive a first write operation associated with a first record

920
Select a first header location in a header portion of a region

930
Write, in the first header location, metadata including a size of the first record 940
Select a first data location in the data portion of the region 950
Write, in the first data location in the data portion, the first record 960
Receive a second write operation associated with a second record before writing of the first record completes 970
Select a second header location in the header portion of the region based on the first header location 980
Write, in the second header location, metadata including a size of the first record 990
Select a second data location in the data portion of the current region based on size of the first record written in the first header location 995
Write, in the second data location in the data portion, the second record before writing of the first record in the first data location completes

FIG. 9

MULTI-STREAM WRITE-AHEAD LOG OPTIMIZED FOR FLASH-BASED STORAGE DEVICES

BACKGROUND

1. Field of the Disclosure

The present disclosure relates to storage systems and more specifically to multi-stream write-ahead log optimized for solid state drives (SSDs).

2. Description of the Related Art

Write-ahead logging is a technique used in storage systems and databases to ensure data durability and consistency, especially in the event of a crash or power failure. Write-head logging involves recording changes to a persistent log before applying those changes to the main data store. The log typically resides on a faster medium, such as SSDs, than the long term storage, such as hard disk drives (HDDs).

An SSD is a type of flash-based storage device. SSDs and HDDs differ significantly in both structure and performance characteristics. SSDs use non-volatile NAND flash memory to store data electronically, with no moving parts. This allows for faster data access, lower latency, and greater resistance to physical shock compared to HDDs. In contrast, HDDs rely on spinning magnetic platters and mechanical read/write heads to access data, which results in higher latency and slower access speeds. While HDDs typically offer larger storage capacities at a lower cost per gigabyte, SSDs provide superior performance, particularly for workloads involving frequent random reads and writes. These differences make flash storage preferable for high-speed, high-reliability applications, whereas HDDs remain a cost-effective solution for bulk storage.

As a result, SSDs are often used for write-ahead logging, while HDDs are commonly used for long term storage. However, existing storage systems often fail to leverage SSDs' ability to handle random writes efficiently while minimizing performance and durability trade-offs. For example, traditional logging approaches typically use a single, sequential log optimized for hard drives and enforce global ordering across writes, which limits concurrency and scalability.

SUMMARY

The present disclosure relates to systems and methods for efficiently managing temporary storage of write operations in flash-based non-volatile storage devices. In particular, the disclosed techniques enable reliable, high-throughput logging of write operations using a circular log structure optimized for flash storage characteristics, including wear-leveling and erase block granularity.

In some embodiments, the system divides a logical address space of a flash-based non-volatile storage device (such as a solid-state drive) into a plurality of regions, where each region corresponds to one or more erase blocks. Within each region, a header portion is allocated for storing fixed-sized record headers, and a data portion is allocated for storing variable-length data records associated with received write operations. Each record header stores metadata such as the record size of the corresponding data in the region.

Records associated with write operations are temporarily stored in the flash-based storage device using this region-based structure. The method supports partially overlapping writes, allowing a second record to be written to the flash device before the first record has completed writing, thereby enabling parallelism and maximizing device throughput. Once the records are successfully flushed to a long-term non-volatile storage device, the storage system determines whether a region has become obsolete. If so, a TRIM command is issued to the flash-based storage device, prompting the flash translation layer (FTL) to erase all data in the region in a block-efficient manner, reducing write amplification and extending device longevity.

In some embodiments, the regions form a circular log structure that allows wrap-around reuse once earlier regions have been trimmed and erased. Additional embodiments provide mechanisms for confirming record persistence to client devices, re-flushing records after power loss events, and adaptively managing region reuse based on record obsolescence and storage system state.

The disclosed techniques provide improvements in performance, consistency, and SSD endurance over traditional logging or buffering methods, particularly in systems requiring high write throughput with durability guarantees, such as distributed storage nodes or file systems.

BRIEF DESCRIPTION OF THE DRAWINGS

The teachings of the embodiments can be readily understood by considering the following detailed description in conjunction with the accompanying drawings.

FIG. 8 is a flowchart of an example method for managing storage system based on failure rates of storage devices, in accordance with one or more embodiments.

FIG. 9 is a flowchart illustrating an example method for writing multiple records, each associated with a corresponding write operation, in parallel to a flash-based storage device, in accordance with one or more embodiments.

Figure 1:
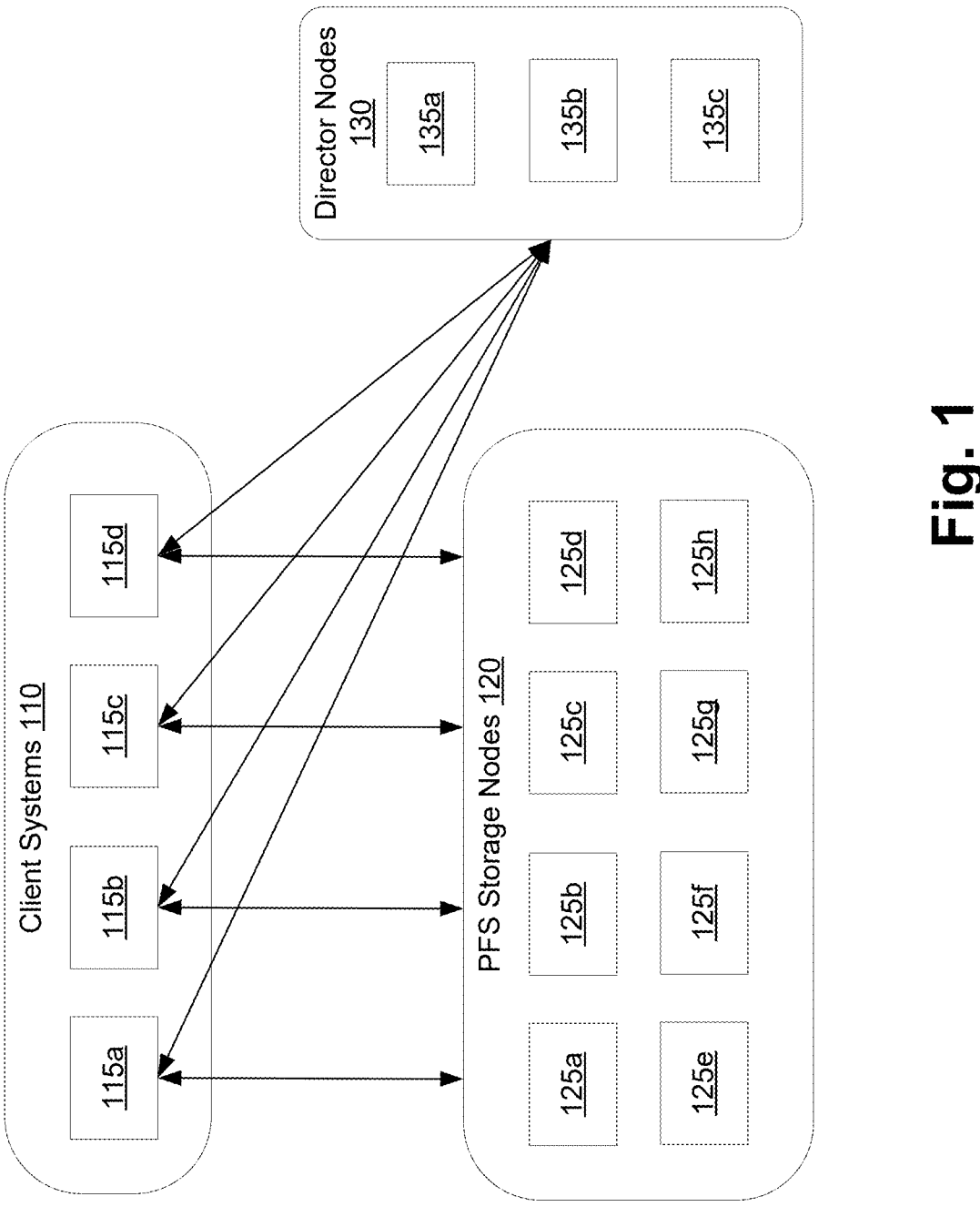
FIG. 1 illustrates the various components in the system environment of a storage system, in accordance with one or more embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

Distributed storage systems may employ write-ahead logging to achieve durability for client write operations. In such systems, write requests are first logged to a fast, non-volatile medium such as SSDs before being permanently stored on slower larger-capacity storage devices such as hard disk drives (HDDs). As such, data is less likely to be lost in the event of sudden power failure, node crash, or another fail-stop event.

Traditional write-ahead log implementations typically rely on a single, sequential log structure and are often optimized for use with hard drives, which are most efficient when written to in large, strictly sequential blocks. For example, many existing systems enforce global ordering across all write operations, even when such ordering is not required for correctness. This limits concurrency and overall system throughput. These implementations do not scale well in systems that need to handle concurrent writes to multiple files or that require high throughput and low latency using flash-based storage devices like SSDs.

Furthermore, SSDs present unique characteristics compared to HDDs. Unlike HDDs, SSDs typically do not support in-place overwrites of existing data and instead perform erase operations on entire blocks prior to writing new data. These erase operations are generally aligned with the device's internal erase block structure. When alignment is suboptimal, it can result in increased write amplification, which may reduce device lifespan and degrade performance.

The embodiments described herein address the above-described issues by introducing a storage system that includes a region-based, multi-log write-ahead logging subsystem optimized for flash-based storage device, such as SSDs, which enables concurrency, reduces write amplification, and supports efficient crash recovery. The system uses a flash-based storage device (e.g., SSD) as a temporary write-ahead log that supports concurrent write operations. The flash-based storage device is divided into multiple regions, each containing a header portion for metadata and a data portion for payloads. Each write operation is logged by independently storing its metadata and data into available header and data locations within a selected region. The system supports concurrent write operations to different files, with each file maintaining its own logical write order. Write operations are completed to the flash-based storage device without requiring global ordering, thereby improving concurrency and throughput.

Further, to reduce SSD wear and write amplification, the system tracks which records are no longer needed and erases entire regions in bulk once all contained records have been safely persisted to a second, long-term storage device (e.g., HDD). Regions are reused in a circular manner. As such, write performance, durability, and SSD endurance are balanced, enabling the cost-effective deployment of lower-endurance SSDs in high-throughput environments.

Additional details about the storage system are further described below with respect to FIGS. 1-9.

Example Storage System

FIG. 1 illustrates the various components in the system environment of a storage system, according to an embodiment. The system environment of the storage system includes a set 110 of client systems 115a, 115b, 115c, 115d, a set 120 or storage nodes 125a, 125b, 125c, 125d, 125e, 125f, 125g, 125h and a set 130 of director nodes 135a, 135b, 135c. The director nodes 135 and storage nodes 125 are computer systems that run the storage system. A client system 115 includes a client driver that is a loadable software module that interacts with the director nodes and storage nodes to read and write the files stored by the storage system. Any required administration is performed via a graphical user interface (GUI) or call level interface (CLI) running on a director node 135. All the director nodes and storage nodes work together to provide a single file system namespace referred to as a realm.

According to an embodiment, the storage system separates the control plane from the data plane. The director nodes 135 in the storage system form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the storage system storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the storage system form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the storage system is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The storage system scales out both director nodes 135 and storage nodes 125. For any given configuration of the system, additional director nodes can be added for more metadata processing performance. Similarly additional storage nodes can be added for more capacity or more storage performance.

Figure 2:
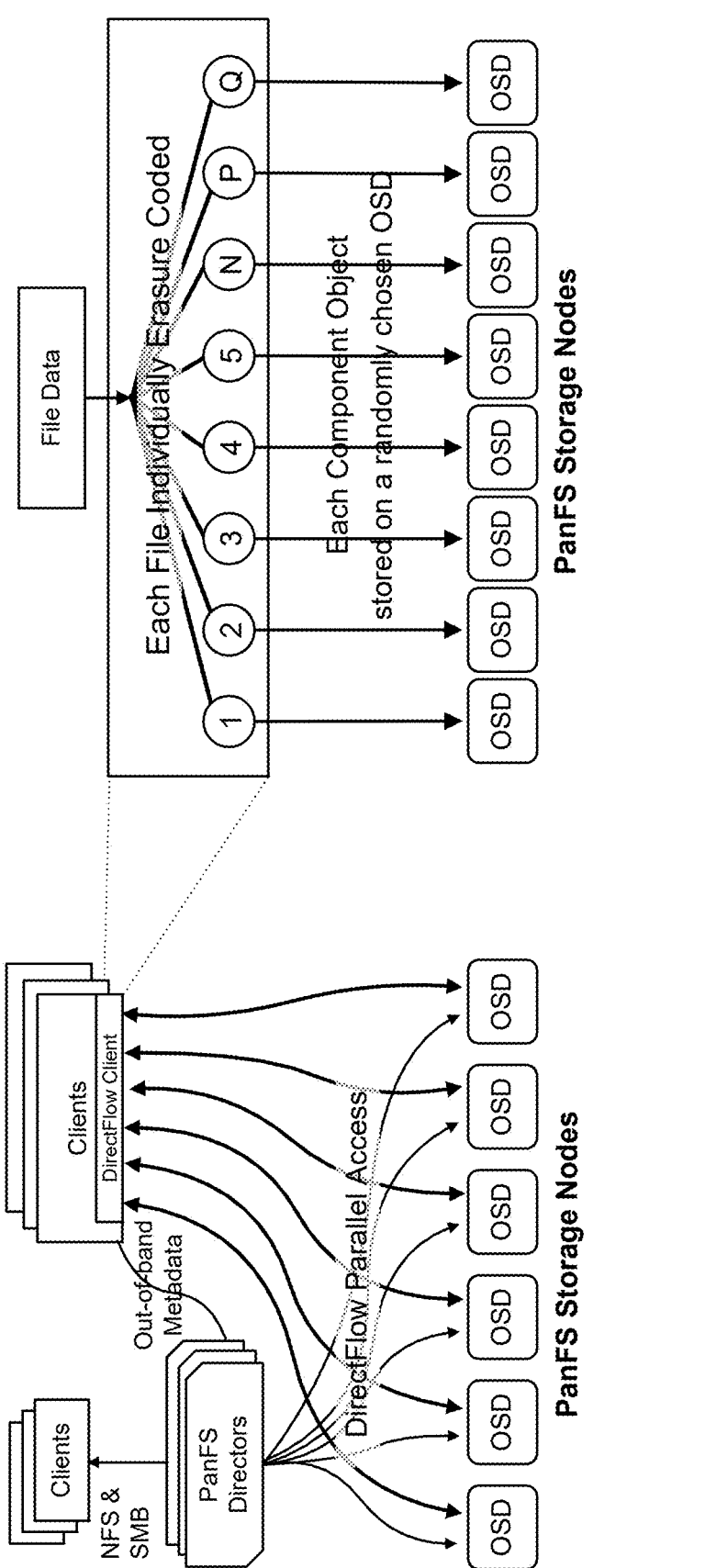
FIG. 2 illustrates how data is stored in a file in the storage system, in accordance with one or more embodiments.

FIG. 2 illustrates how data is stored in a file in the storage system, according to an embodiment. The storage system uses multiple storage nodes by assigning a map to each file. The map for a file shows where all the striped component parts of that file are located, and which storage node holds each part. The client driver uses the map to determine which storage nodes to access, directly or in parallel. storage system uses network erasure coding as part of that striping to ensure data integrity and reliability.

The client driver provides the semantics of a locally-mounted, POSIX-compliant file system. The storage system ensures that if a process P2 (possibly on another compute server) is writing to a file at the same time the process P1 is reading from the file, this process P1 will not read stale data. Accordingly, storage system provides cache coherency across all the nodes running the client driver.

storage system performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the storage system provides a consistent system performance.

Figure 3:
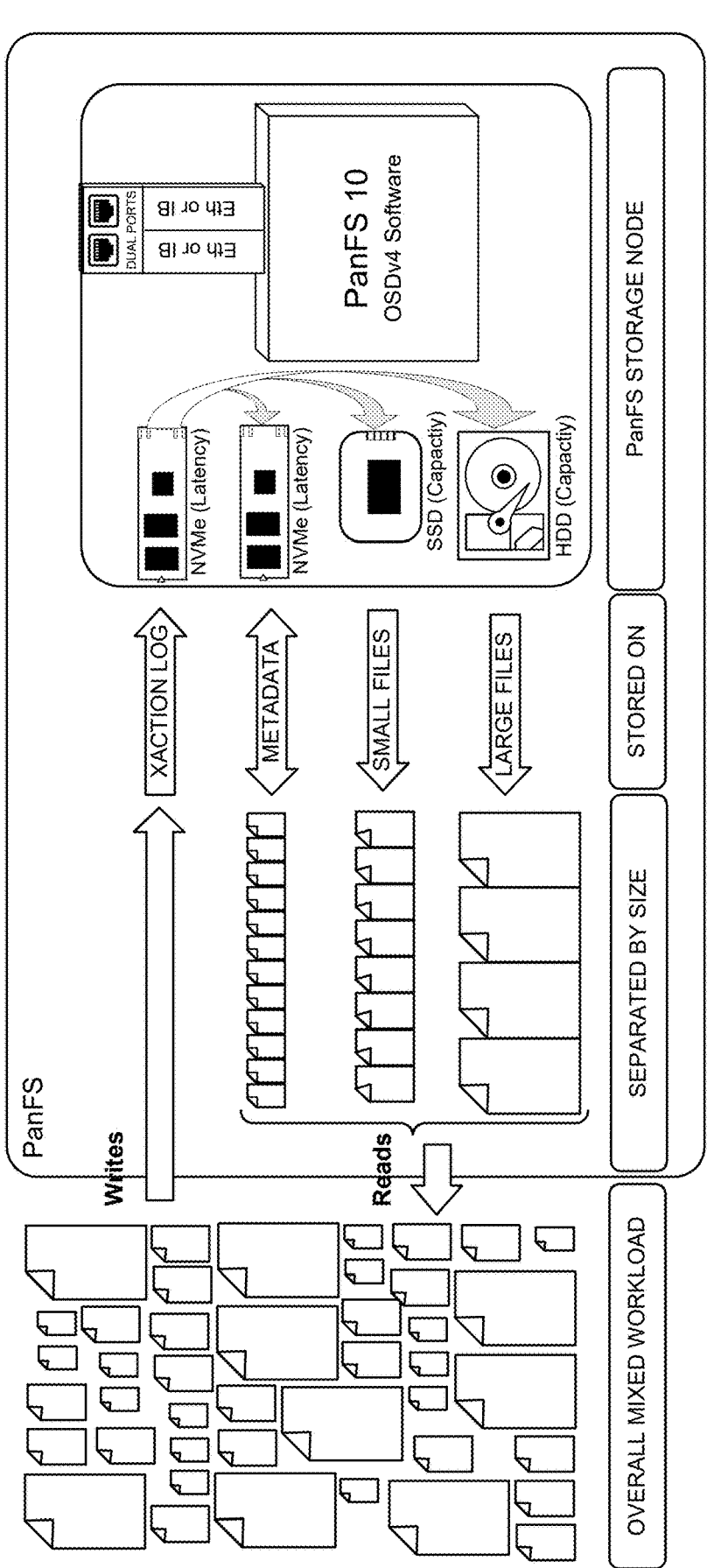
FIG. 3 illustrates the operation of storage nodes of the storage system, in accordance with one or more embodiments.

FIG. 3 illustrates the operation of storage nodes of the storage system, according to an embodiment. The storage system architecture provides performance and reliability advantages as well as significant performance optimizations using the storage node software to enable efficient use of the available storage media inside each storage node. The storage system storage node handles multiple performance tiers of storage. According to an embodiment, the different performance tiers of a storage node include storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The storage system takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The storage system tries to keep each SSD full above a threshold level, for example, above 80% full. If an SSD falls below that threshold level, the storage system selects the smallest component objects from the next slowest set of drives and moves them to the SSD until it is about 80% full. If the SSD is too full, storage system moves the largest component objects on the SSD to the next slower tier of drives. Every storage node performs this optimization independently and continuously. A storage node selects component objects to move by looking in its local metadata database.

Storage nodes in the storage system are object storage devices (OSDs). An object stored in an OSD is a Small Computer System Interface (SCSI) object. The storage system can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the storage system supports multiple blade sets in a realm and in the same namespace at the same time.

Figure 4:
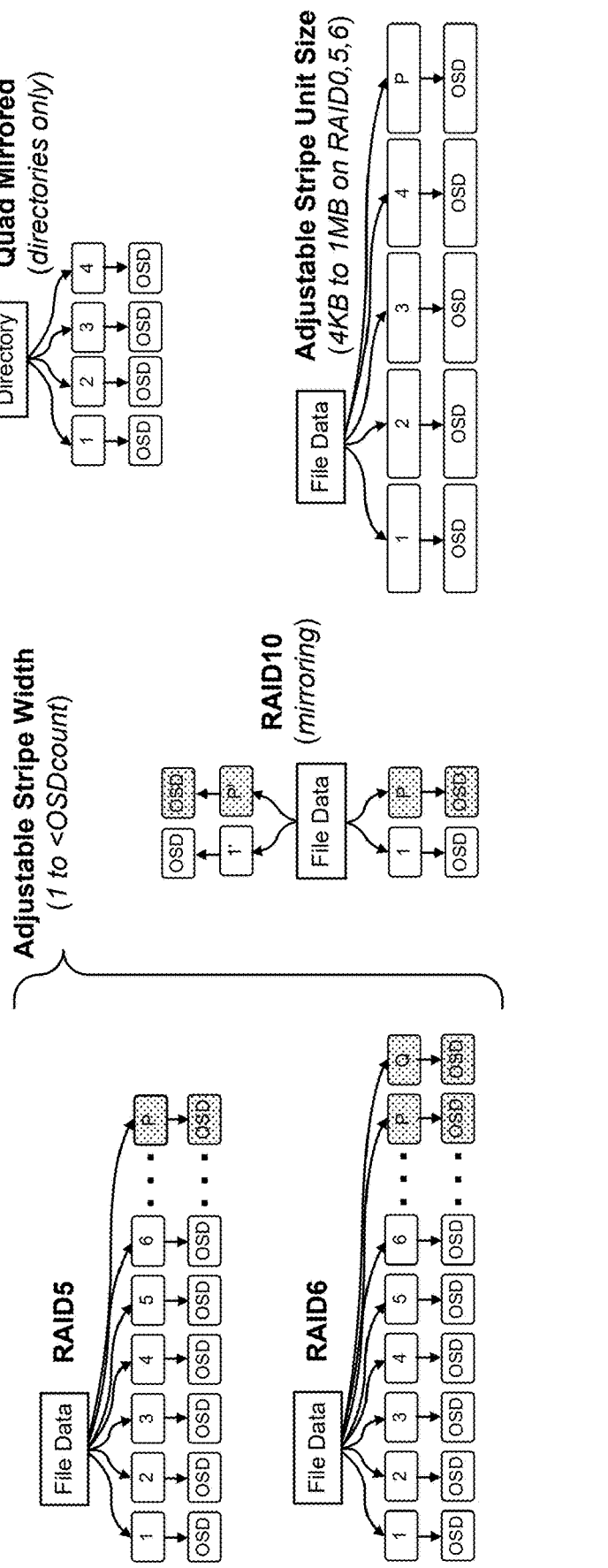
FIG. 4 shows the details of layout of a file stored in the storage system, in accordance with one or more embodiments.

FIG. 4 shows the details of layout of a file stored in the storage system, according to an embodiment. The storage system stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The storage system stores large POSIX files using erasure coding across multiple component objects, and store small POSIX files using triple-replication across three component objects. This approach delivers higher performance and makes it more space efficient. Unless the first write to a file is a large one, the storage system starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a storage system storage node fails, the storage system reconstructs only those component objects that were on the failed storage node. This is distinct from a RAID array that would reconstruct the entire raw capacity of the storage node. The storage system reads the component objects for each affected file from all the other storage nodes and uses each file's erasure code to reconstruct the component objects that were on the failed node.

When a BladeSet in the storage system is first set up, the storage system sets aside a configurable amount of spare space on all the storage nodes in that BladeSet to hold the output from file reconstructions. When the storage system reconstructs a missing component object, it writes it to the spare space on a randomly chosen storage node in the same BladeSet. As a result, during a reconstruction the storage system uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the storage system protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the storage system maintains a complete directory tree, it can identify the full pathnames of precisely which files need to be restored from a backup or reacquired from their original source, and can therefore also recognize which files were either unaffected or recovered using their erasure coding.

Example Multi-Stream Write-Ahead Log

Figure 5:
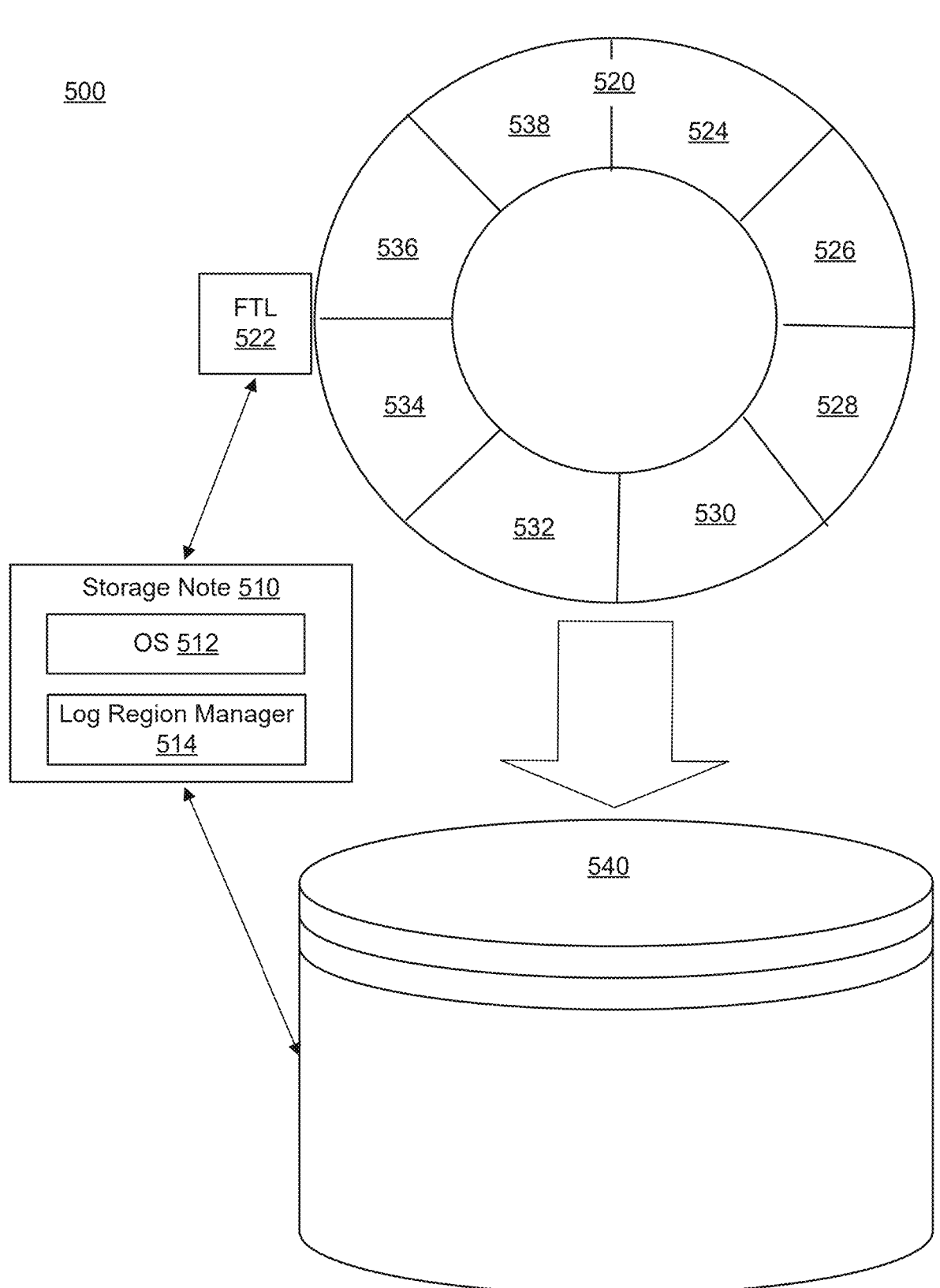
FIG. 5 illustrates a storage system for managing write-ahead logging in a storage node, in accordance with one or more embodiments.

FIG. 5 illustrates a storage system 500 for managing write-ahead logging in a storage node, in accordance with one or more embodiments. The storage system 500 includes a storage node 510, a write-ahead log storage device 520 and a long term storage device 540. The write-ahead log storage device 520 has a faster write speed than the long term storage device 540 and serves as a buffer. Records associated with write operations are first written to the write-ahead log storage device 520 at a first speed. These records are then transferred from the write-ahead log storage device 520 to the long term storage device 540 at a second speed, which is slower than the first. Both the write-ahead log storage device 520 and the long term storage device 540 are non-volatile, so when power is lost, the records stored in the write-ahead log storage device 520 are preserved and can be recovered. The write-ahead log storage device 520 is a flash-based storage device, such as SSD, to enable fast write operations. The long term storage device 540 can be any type of storage devices, such as HDD or SSD, to provide large storage capacities.

Unlike HDDs, flash memory (such as SSDs) of the write-ahead log storage device 520 cannot be overwritten directly. Instead, flash must be erased before it can be rewritten, and erases happen in large chunks (called erase blocks), but writes happen in small chunks (called pages). This mismatch in granularity, along with the limited number of times a flash cell can be written to (called write endurance), makes raw flash memory hard to use directly. A flash translation layer (FTL) 522 addresses this issue by acting like a middleware between the operating system (OS) 512 of the storage node 510 and the flash-based storage device 520. The FTL 522 maps logical block addresses (LBAs) from the OS 512 which assumes the disk behaves like a hard drive to physical flash locations to enable wear leveling, so that all flash cells wear out at similar rates.

In some embodiments, the FTL 522 operates as an abstraction layer between the logical block addressing (LBA) interface presented to the log region manager 514 and the underlying physical flash memory structure of the flash-based storage device 520. The FTL 522 is configured to perform a number of functions that collectively enable the use of flash-based storage device 520 in storage environment that expect block-based, rewritable media.

In particular, the FTL 522 may perform logical-to-physical address translation. The log region manager 514 issues write and read requests using LBAs, which are translated by the FTL into physical addresses within the flash memory. This mapping may be maintained using a mapping table stored in random access memory (RAM) and/or flash memory in the flash-based storage device 520, and may employ page-level, block-level, or hybrid mapping schemes. The logical-to-physical mapping enables the flash-based storage device 520 to appear to the host as a conventional block device, while allowing the FTL 522 to optimize physical data placement internally. The FTL 522 is configured to perform wear leveling. Because individual flash memory cells can only be erased and reprogrammed a finite number of times, the FTL 522 distributes write and erase cycles across the available memory cells to prevent premature failure of any specific region. Wear leveling may be static or dynamic, and may involve relocating static data to ensure even wear across the device.

Further, the FTL 522 may further manage garbage collection operations. During garbage collection, the FTL 522 identifies physical memory blocks that contain a mix of valid and invalid (e.g., obsolete or overwritten) data. The valid data is copied to a new location, and the original block is subsequently erased and returned to the pool of available blocks. This process allows flash memory to be reused for new write operations, but may result in additional internal data movement, contributing to a phenomenon known as write amplification.

Write amplification occurs in flash-based storage devices (e.g., SSDs), where the amount of actual physical data written to the flash memory exceeds the amount of data written by the log region manager 514. Write amplification can be measured by a metric called write amplification factor (WAF) which is the ratio of the total number of bytes physically written to the non-volatile memory medium to the number of bytes issued in write operations by the storage node 510, represented by the following Equation (1):

$$\text{Write Amplification Factor (WAF)} = \text{Bytes written to flash/Byte written by host} \qquad \text{Equation (1)}$$

Write amplification arises primarily due to the internal behavior of the FTL 522, which must periodically relocate and erase memory blocks to accommodate new writes. In particular, write amplification is primarily caused by two limitations of flash memory: (1) erase-before-write constraint, and (2) garbage collection. As described above, flash memory cells cannot be overwritten directly. Data must be erased before a new write can occur. However, erasure happens at the granularity of an erase block, which may be much larger (e.g., 128 KB-4 MB) than a typical write (e.g., 4 KB). Further, when data is updated, the new version is written to a new location, and the old version is marked invalid. Over time, erase blocks become partially filled with obsolete data. To free up space, the FTL 522 performs garbage collection by copying valid data from a partially used erase block to a new block, erasing the old block, and then reusing it. This internal copying contributes to extra writes that were not explicitly requested by the host.

Impact of high WAF includes performance degradation, reduced endurance, and increased costs. Write amplification introduces additional internal operations within the storage device that are not directly initiated by the storage node 510. These operations include relocating valid data, performing erase operations, and updating mapping tables within FTL. The overhead associated with these operations consumes input/output bandwidth and processing cycles, thereby increasing write latency and reducing overall throughput of the storage device.

Further, flash memory cells possess a finite number of program/erase cycles before degradation leads to data retention failures or cell wear-out. Write amplification increases the total number of physical writes issued to the flash memory, thereby accelerating wear. As a result, the effective lifetime of the device is shortened, necessitating more frequent replacements or the use of higher-endurance (and higher-cost) components to meet longevity requirements. In order to mitigate the adverse effects of write amplification, storage systems may require overprovisioning of flash memory to provide spare capacity for internal operations. Alternatively, systems may be provisioned with high-endurance NAND flash technologies that incur greater manufacturing costs. In both scenarios, the economic efficiency of the storage system is adversely impacted due to the additional resource requirements imposed by write amplification.

Accordingly, reducing write amplification is an important objective in the design of flash-based logging systems. The embodiments described herein achieve this objective by structuring log data and erasure operations in a manner that aligns with the physical erase characteristics of flash memory, thereby minimizing internal data relocation and reducing the total volume of writes to the device.

In particular, the memory system 500 describe herein includes a storage node 510. The storage node includes an operating system (OS) 512 and a log region manager 514, which resides in a software stack below the OS 512 and above the flash-based storage device 520's FTL 522. The log region manager 514 divides write-ahead log storage device 520 into multiple log regions 524, 526, 528, 530, 532, 534, 536, and 538, each of which aligns with the physical erase blocks of the flash-based storage device 520 and can be independently managed and erased in its entirety once all log records contained therein are deemed obsolete. For example, each log region 524 may correspond one or more physical erase blocks.

A TRIM command is a data management instruction that allows the log region manager 514 to inform the flash-based storage device 520 that certain LBAs are no longer in use and do not need to be preserved. This enables the FTL 522 to mark those blocks as invalid and eventually erase them during garbage collection, without copying them unnecessarily. The memory system 500 allows for bulk TRIM operations to be issued at the level of complete regions, thereby informing the FTL 522 that an entire contiguous segment of logical addresses is no longer in use.

Because the FTL 522 tends to group temporally proximate writes into the same erase blocks, issuing TRIM commands on whole regions increase the likelihood that such erase blocks will contain only invalidated data. As a result, the FTL 522 can perform erase operations without needing to copy valid data to other physical locations. This reduces internal data movement and therefore reduces write amplification, which in turn improves the endurance and lifespan of the flash-based storage device 520.

Furthermore, by enabling erasure of log regions 524-538 in a coordinated and predictable manner, the memory system 500 permits the use of lower-endurance, cost-efficient flash-based storage devices (e.g., SSDs) while still maintaining high reliability and data durability guarantees. Thus, the log structure and operation described herein synergistically leverage the internal behavior of the FTL 522 to optimize performance and longevity of the log device 520 in write-intensive applications.

In some embodiments, the storage system 500 uses the log regions 524-538 sequentially. When a log region is filled, the storage system advances to a next region. If the next region is erased or empty, logging can proceed immediately. Otherwise, the system determines whether all records in the next region is obsolete, erases the region, and proceeds. Once all available regions have been used, the system wraps around to the beginning and repeats this cyclic process, analogous to a circular buffer, but at the granularity of whole regions rather than individual records. For example, when a first log region 524 is full or nearly full, a second log region 526 is used to store a next set of write operations, and so on and so forth. After a last log region 538 is full, the first log region 524 is erased, and reused to store a next set of write operations.

By batching records into log regions and erasing entire regions once all contained records are obsolete, the system 500 avoids the need for partial erasures or internal data relocation by the flash-based storage device 520's FTL 522. This minimizes write amplification and preserves flash-based storage device 520's endurance. The TRIM operation is employed to notify the device 520 of large, continuous regions that can be safely erased. Upon receiving a TRIM command, the FTL 522 marks the corresponding physical locations as invalid, allowing the associated memory blocks to be erased without requiring internal copying of unnecessary data during subsequent garbage collection operations.

Figure 6A:
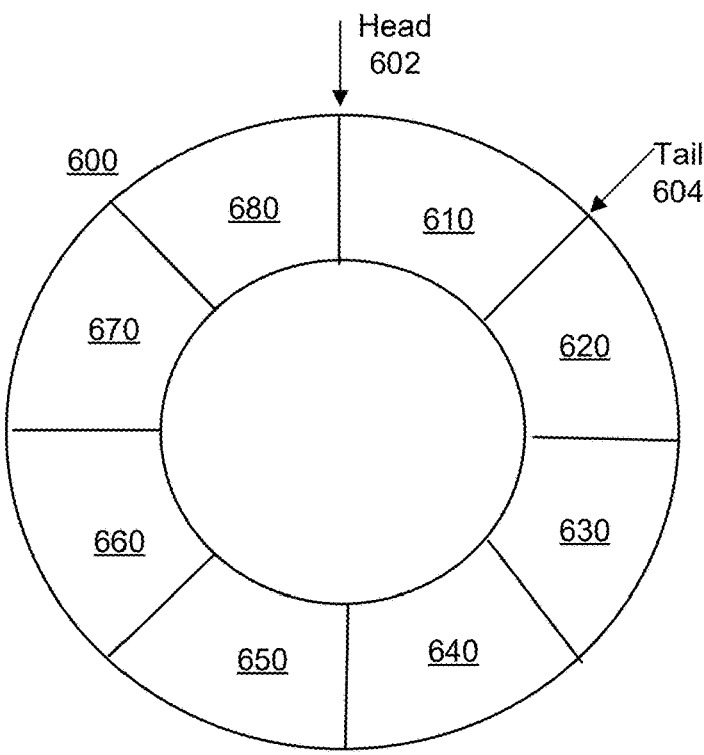
FIGS. 6A through 6F illustrate a process of using a circular log data structure to cache write operations in a flash-based storage device, in accordance with one or more embodiments.

FIGS. 6A through 6F illustrates a process of using a circular log data structure to log write operations in a flash-based storage device, in accordance with one or more embodiments. FIG. 6A illustrates a flash-based storage device 600, corresponding to the flash-based storage device 520 of FIG. 5. The flash-based storage device 600 is divided into multiple regions 610, 620, 630, 640, 650, 660, 670, 680, which corresponds to the regions 524 through 538. The circular log data structure includes two logical pointers: a head 602 and a tail 604. The head 602 of the circular log denotes a position at which an oldest record in the log that has not yet been erased. The head 602 is analogous to a front pointer in a queue, indicating a next item to be erased. When the system determines that certain records are no longer needed (e.g., records in a region have been successfully flushed to long-term storage), the head 602 advances past them, freeing up space for future writes. The tail 604 of the circular log denotes a position at which a new record is written. After writing a new record, the tail 604 advances to a next slot (which wraps around if needed). If the tail 604 advances to a position already occupied by data (i.e., it catches up to the head 602), this means the log is full, and further writes needs to pause until the region is erased.

Figure 6B:
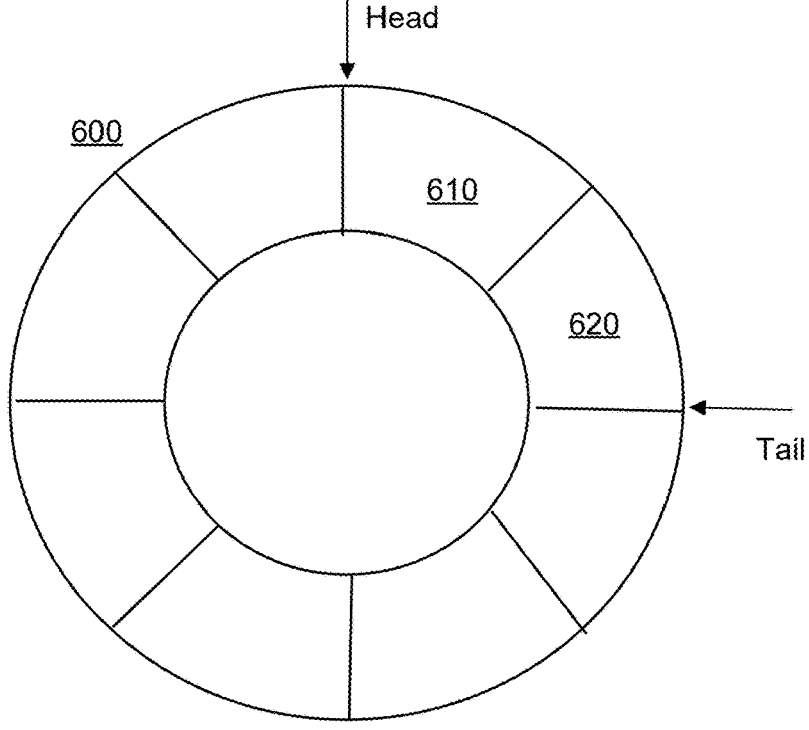
Figure 6C:
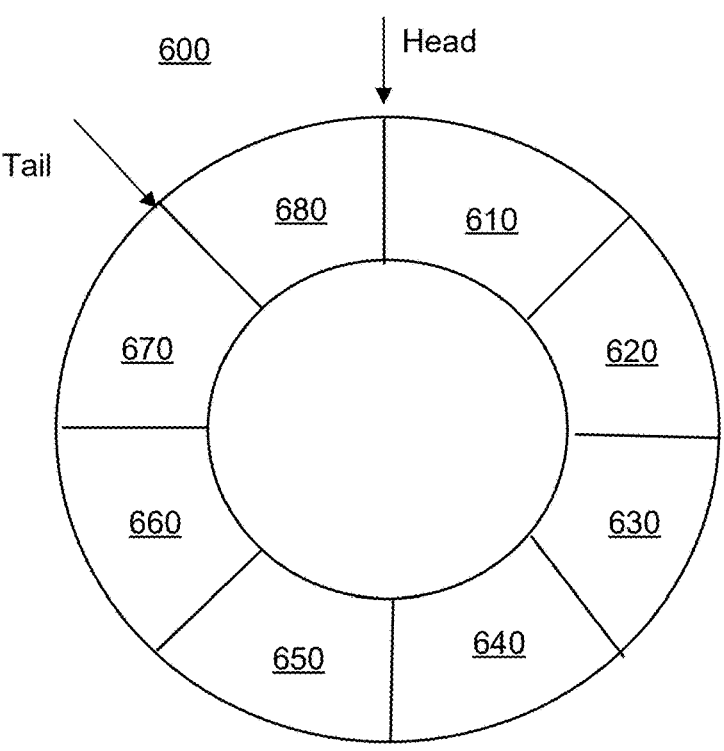
Figure 6D:
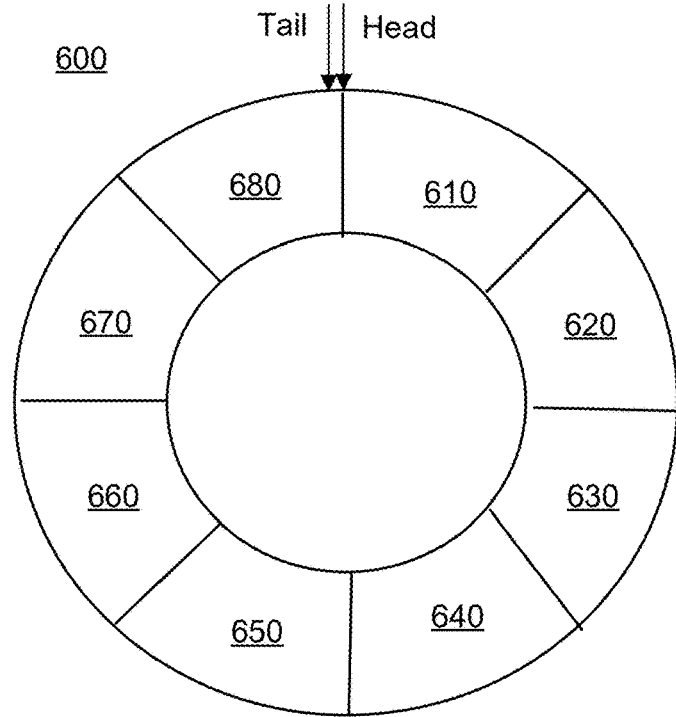

As illustrated in FIG. 6A, the head 602 is at the beginning of a first region 610, and the tail 604 is at the end of the first region 610. After the first region 610 is full, the records are written into a next region 620. As illustrated in FIG. 6B, the head 602 remains at the beginning of the first region 610, and the tail 604 is at the end of the second region 620. This process continue, the log will eventually get full. As illustrated in FIG. 6C, the head 602 remains at the beginning of the first region 610, and the tail 604 is at the end of region 670. As illustrated in FIG. 6D, the head 602 and tail 604 are both at the end of the last region 680 (which is the beginning of the first region 610). That is, the tail catches the head.

Figure 6E:
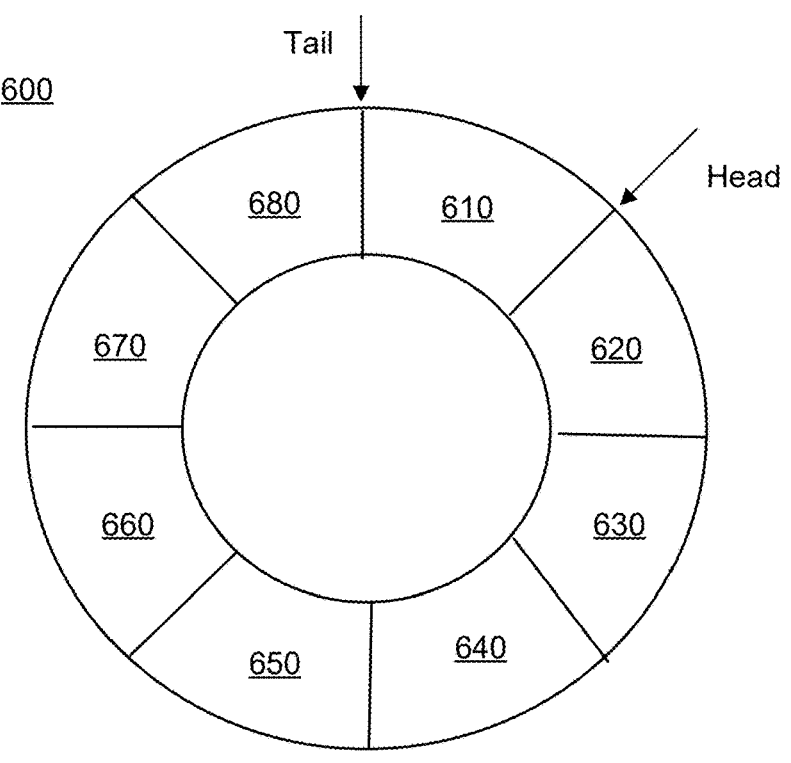
Figure 6F:
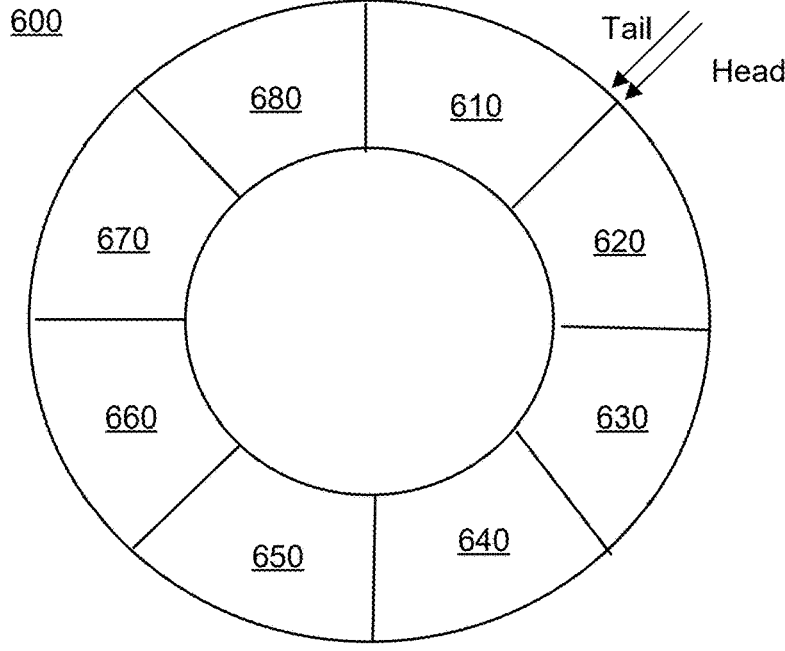

After this happens, the system determines whether all the records in the first region 610 are obsolete, i.e., the records in the first region 610 have been flushed in the long term storage device 540. In response to determining that the records in the first region 610 are obsolete, the log region manager 514 issues a TRIM command to cause the FTL 522 to erase the blocks corresponding to the first region 610. Referring to FIG. 6E, after the region 610 is erased, the head 602 moves to the end of the first region 610, and region 610 can now be used to cache additional records. Referring to FIG. 6F, after the tail 604 reaches the end of region 610, the tail 604 catches the head 602 again, and the log region manager 514 may issue a TRIM command to cause the FTL 522 to erase the blocks corresponding to the second region 620.

In some embodiments, in response to determining that a region (e.g., Region 610-680) is obsolete, the log region manager 514 issues a TRIM command. Accordingly, TRIM commands are issued proactively, prior to the tail 604 reaching the head 602. As a result, obsolete regions are erased in advance, and the tail 604 does not catch up to the head 602. In some embodiments, the storage system determines whether a threshold portion of the log region space is full. The threshold may be less than 100%, such as 90%, 80%, or 70%. In response to determining that the threshold is reached, the log region manager 514 identifies a region containing the oldest obsolete records and issues a TRIM command, thereby marking that region for erasure during a subsequent garbage collection operation.

In some embodiments, unlike hard disk drives (HDDs), flash memory lacks moving parts and does not incur mechanical latency. This architectural characteristic enables multiple memory cells to be written in parallel, provided that the target cells reside in distinct internal units that do not interfere with one another. The memory system 500 leverages this property to allow multiple records associated with write operations to be cached into the circular log device 520 concurrently or in parallel.

To facilitate parallel write operations, each log region is partitioned into two portions: a header portion and a data portion. The header portion is configured to store metadata corresponding to each write operation, including the size of the associated record. The data portion is configured to store the actual record data corresponding to the write operations.

Figure 7:
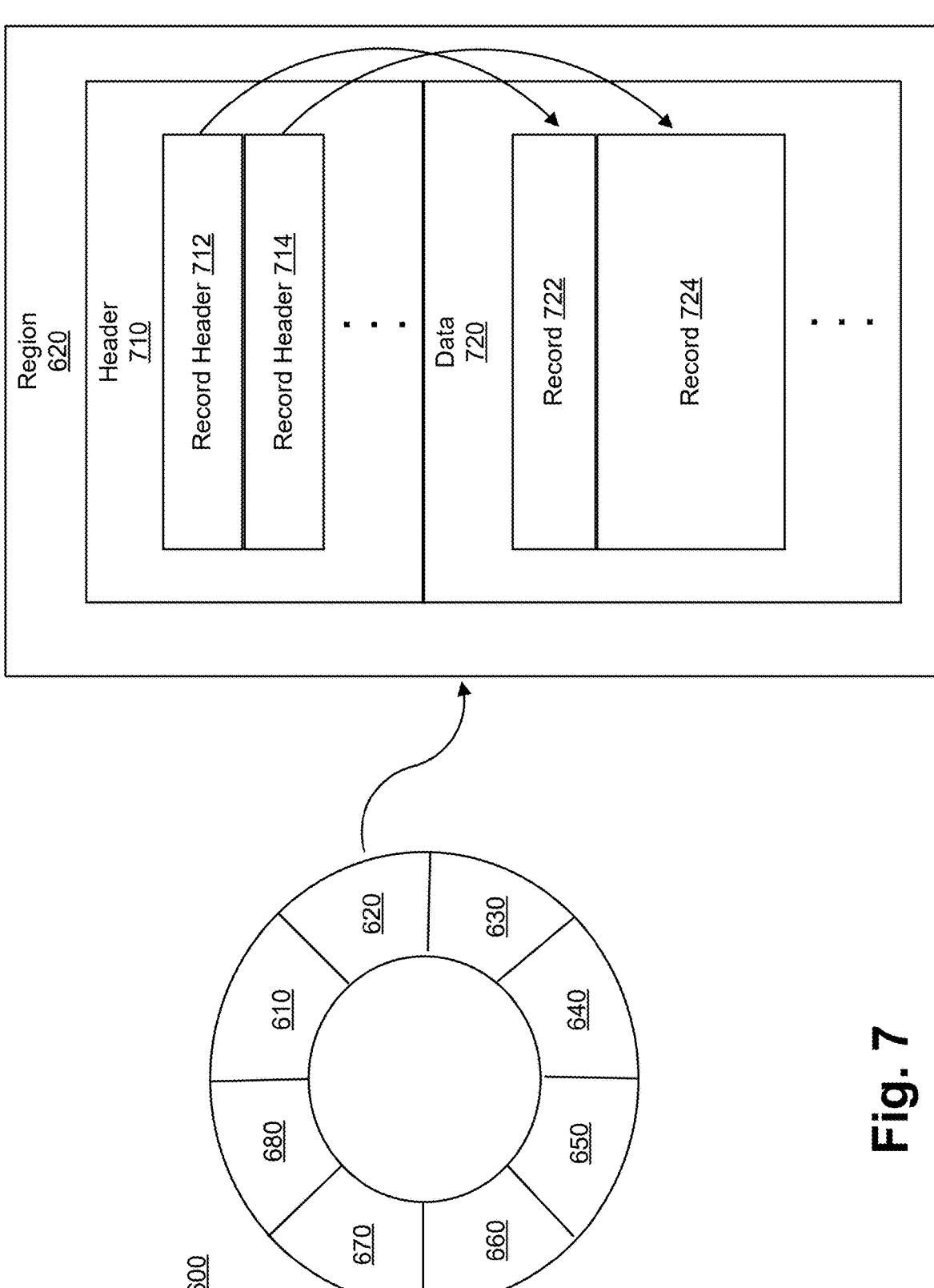
FIG. 7 illustrates an example data structure of a region, in accordance with one or more embodiments.

FIG. 7 illustrates an example data structure of a region, in accordance with one or more embodiments. As illustrated in FIG. 7, a circular log stored in a flash-based storage device 600 includes multiple regions 610 through 680. Each region (e.g., region 620) includes a header portion 710 and a data portion 720. In response to receiving a write operation, a record header 712 is generated and stored in the header portion 710. The corresponding record 722 is then written into the data portion 720.

Because record headers are relatively small in size, they can be written to the header portion 710 with minimal latency. Accordingly, multiple write operations may be performed at least partially concurrently. For example, in response to receiving a first write operation, a first record header 712 is written to the header portion 710, and a corresponding first record 722 is written to the data portion 720. While the first record 722 is still in the process of being written to the data portion 720, a second write operation may be received. In response, a second record header 714 is written to the header portion 710, and a corresponding second record 724 is written to the data portion 720—even before the first write operation has completed.

This is possible because the first record header 712 includes metadata specifying the size of the first record 722. As such, the system can determine the total space required to complete the first write operation and identify a starting address in the data portion 720 that follows the end of the first record 722. This allows the second record 724 to be written without conflicting with the in-progress write of the first record. Similarly, a third write operation may be received before completion of the second write operation. In response, a third record header is recorded in the header portion 710, and the system can identify an available address following the end of the second record 724 to begin writing the third record.

Example Method for Region-Based Log Management for Flash Memory

FIG. 8 is a flowchart of an example method 800 for region-based log management for flash memory, in accordance with one or more embodiments. The steps in the method 800 may be performed in any sequence. In some embodiments, more or fewer steps may be included in the method 800. The method 800 may be performed by a computing system, e.g., a storage system or a storage node 120, described herein with respect to FIGS. 1-7.

The storage system divides 810 a logical address space of a flash-based non-volatile storage device into a plurality of regions. Each region corresponds to one or more erase blocks of the flash-based non-volatile storage device, such as an SSD. Flash-based non-volatile storage device has certain characteristics different from HDDs. For example, flash-based devices can't overwrite individual bytes or blocks directly. Even though small data units-such as 4 KB blocks—can be written to a flash-based storage device, the device must erase larger blocks in their entirety, typically 128 KB or more (referred to as erase blocks). If an erase block contains any remaining valid data prior to being erased, that valid data must first be copied to another block. This process results in additional write operations and increases write amplification on the flash-based storage device. By dividing the address space into defined regions that align with the erase blocks, the storage system can manage erase operations more efficiently. This is because when the flash-based storage device performs garbage collection, it reduces the need of moving data from one erase block to another.

For each region, the storage system allocates 820 a header portion for storing one or more fixed-sized record headers and a data portion for storing one or more variable-length records. Each header includes metadata, such as which file the record belongs to, sequence number, size of the actual data, offset (where in the data portion to find it), a checksum for integrity checking, among others. As such, headers are small, fixed sized data structures. The data portion holds the actual payload data—the bytes being written by users or client devices. These records can be any size (i.e., variable-length), depending on what the users or client devices wrote.

A checksum is a small piece of data-usually a fixed-size numerical value-generated from a larger block of data, and used to detect errors or changes in that data. In some embodiments, the storage system computes a checksum for each record prior to writing the record to the flash-based non-volatile memory device. The checksum is a compact representation of the record's contents and may be generated using any suitable hash or error-detection function, such as a cyclic redundancy check (CRC), a cryptographic hash function, or a summation algorithm. The checksum is stored as part of the record's metadata in a corresponding record header. During recovery operations, such as after a power failure, the storage system reads the stored checksum and recalculates a checksum from the data portion of the record. If the recalculated checksum matches the stored checksum, the system determines that the record was completely and correctly written. If the checksums do not match, the system treats the record as incomplete or corrupted and may discard it. The use of checksums enables the storage system to efficiently and reliably verify the integrity of variable-length records, thereby improving the robustness of the write-ahead logging mechanism.

Because all headers are fixed size and stored in one predictable part of the flash-based storage device, the storage system can locate any header quickly by sequentially traversing each of the headers. After a crash or power failure, the storage system can scan the header portion (which is compact and well-structured) to know what's in the log and which data blocks are valid. Further, keeping headers and data separate allows the storage system to select a location store payload before previous write operation completes. This means multiple writes can happen concurrently, partially overlapping in time, or out-of-order.

The storage system receives 830 a plurality of write operations associated with a plurality of records. For example, the storage system may receive multiple write requests from different client devices, and each request contains or corresponds to a record—e.g., a record that needs to be logged and eventually written to long term storage (e.g., an HDD). These write operations may come from users or applications using the storage system. The write operations may be writing to different files and can arrive concurrently or sequentially. These write operations can be different sizes, i.e., some might be small writes, others large.

The storage system temporarily stores 840 the plurality of records in a region of the flush-based non-volatile storage device. At this moment, the records are not yet stored in their final destination—that is, a long-term storage device. Instead, they are first being written to a log that resides on a flash-based storage device, which generally offers faster write speeds than long-term storage. This log is also referred to as a write-ahead log, and it is used to enhance durability. Because flash-based storage has higher write speeds, more records can be persistently stored in a shorter amount of time. Even if a crash or power failure occurs before the long-term storage device completes the write operations, the data is not lost. Additional details about writing to the write-ahead log are further described below with respect to FIG. 9.

The storage system flushes 850 the plurality of records from the region of the flash-based non-volatile storage device to a long term non-volatile storage device. After storing records in the flash-based storage device, the storage system then moves (also referred to as "flushes") those records to the long-term storage device, like an HDD. The long-term storage device may be slower to write, but better suited for long-term durability and capacity.

In some embodiments, in response to successfully completing the writing of a record associated with a write operation to the flash-based non-volatile memory device, the storage system sends a confirmation to the client device that issued the write operation, acknowledging that the operation was successful. As a result, the client perceives that the write operation has completed with low latency, reflecting the high write speed of the flash-based memory device, even though the corresponding write to the long-term storage device may not yet have been completed.

After one region on the flash-based storage device is full, the system proceeds to use the next region, and so on, until all regions are utilized. As described above, records are temporarily stored on the flash-based non-volatile storage device due to its fast write speed. The device retains these records until they are flushed to long-term storage. Once a record has been successfully flushed to long-term storage, it is considered obsolete and no longer needed.

The storage system determines 860 all records stored in the region of the flash-based non-volatile storage device are obsolete. The determination that all records in the region are obsolete may be based on confirming that the corresponding data has been successfully flushed to the long-term non-volatile storage device and that no further recovery operations require access to those records.

In response to determining that all records stored in the region of the flash-based non-volatile storage device are obsolete, the storage system issues 870 a TRIM command to the flash-based non-volatile storage device. The TRIM command is a special instruction used in flash-based storage systems (like SSDs) to inform the flash-based storage device that certain blocks of data are no longer in use and can be erased.

In response to issuing of the TRIM command, the storage system erases 880 all data in the region, by a flash translation layer of the flash-based non-volatile storage device based on the TRIM command. The FTL is firmware built into the flash-based storage device. The FTL translates LBAs from the host system into physical locations on the NAND flash chips and manages wear leveling, bad block mapping, garbage collection, and block erasures. In response to receiving the TRIM command, the FTL marks those blocks as invalid and schedules them for erasure. During garbage collection, the FTL erases the entire region of the physical flash memory. As described above, since each region is aligned with the erase blocks of the flash-based storage device, no data within these erase blocks needs to be moved prior to erasure, thereby minimizing write amplification.

In some embodiments, the write-ahead log is a circular log that a last region and a first region are logically connected to form a circle. In some embodiments, the storage system retains all records in the log until all regions are full or nearly full. The storage system then issues a TRIM command to erase the region containing the oldest records. For example, assuming the storage system writes sequentially from the first region to the last, once the last region is full, a TRIM command is issued to erase the first region. After the first region is erased, it becomes available for new writes. Once the first region is full again, the second region is erased and reused, and this cycle continues.

As described above, the storage system temporarily stores 840 the plurality of records in a region of the flush-based non-volatile storage device. In some embodiments, storing 840 the plurality of records in the region includes writing multiple records associated with multiple write operations in the flash-based non-volatile storage device in parallel.

FIG. 9 illustrates an example method 900 for writing multiple records associated with different write operations in a flash-based non-volatile storage device in parallel, in accordance with one or more embodiments. The storage system receives 910 a first write operation associated with a first record. The storage system selects 920 a first header location in a header portion of a region. The storage system writes 930, in the first header location, metadata including a size of the first record. The storage system selects 940 a first data location in the data portion of the region. The storage system writes 950, in the first data location in the data portion, the first record.

The storage system receives 960 a second write operation associated with a second record before writing of the first record completes. The storage system selects 970 a second header location in the header portion of the region based on the first header location in the header portion. The storage system writes 980, in the second header location, metadata including a size of the first record. In some embodiments, the storage system may append a new header at an end of the previous headers. The storage system selects 990 a second data location in the data portion of the current region based on the size of the first record written in the first header location. The storage system writes 995, in the second data location in the data portion, the second record before writing of the first record in the first data location completes.

For example, the header portion may include multiple fixed-size header locations (e.g., 4 KB each), and the data portion is configured to store variable-length records. The storage system receives a first write operation associated with a first record, wherein the first record is 12 KB in size. In response, the storage system selects a first available header location in the header portion of the region, such as the first header slot (e.g., Header 0). The storage system writes, to the first header location, metadata associated with the first record. The metadata may include, for example, a file identifier, a logical sequence number, a size field indicating the 12 KB length of the first record, and a checksum value.

The storage system then selects a first data location in the data portion of the region to store the first record. In some embodiments, the data portion begins at offset 0 KB, and the system selects this location for the first record. The storage system initiates writing the first record to the data portion beginning at offset 0 KB.

Before the writing of the first record completes, the storage system receives a second write operation associated with a second record, which is 4 KB in size. In response, the storage system selects a second header location in the header portion of the region, which may be the next sequential header location (e.g., Header 1). The storage system writes, to the second header location, metadata including a file identifier, a sequence number, a size field indicating the 4 KB length of the second record, and a checksum.

Based on the size of the first record, as indicated in the first header location, the storage system selects a second data location in the data portion of the region to store the second record. For example, the system may compute the offset for the second data location to begin at 12 KB, immediately following the first record's 12 KB allocation. The second record is then written to the data portion beginning at offset 12 KB and spanning 4 KB.

As such, multiple write operations can be performed concurrently or pipelined while maintaining per-file ordering and predictable placement of metadata and data blocks within regions. The separation of header and data locations further facilitates efficient recovery, as the system may scan only the header portion to identify valid records and corresponding data locations following a failure.

Notably, even though the system begins writing the first record before the second record, the second record may complete writing first due to its smaller size relative to the first record. In some embodiments, the storage system is configured to flush records from the flash-based memory to the long-term storage device based on the sequence of the recorded headers. Accordingly, if the logging of the second record completes before that of the first record, the storage system will wait until the first record is fully logged before flushing both records. The first record will be flushed to long-term storage first, followed by the second record. Alternatively, the storage system may be configured to flush records based on the order in which logging is completed. In such embodiments, if the second record is completely logged first, it may be flushed to long-term storage ahead of the first record.

In some cases, a power outage may occur. The storage system is configured to detect a power outage at either the long-term storage device or the flash-based storage device before a record has been flushed from the flash-based storage device to the long-term storage device. Upon recovering from the power outage, the storage system identifies any records that were not flushed and re-flushes them from the flash-based non-volatile storage device to the long-term storage device. As such, even if a power outage occurs before a record reaches long-term storage, the storage system has already persistently stored the record in the flash-based storage device, which serves as a write-ahead log and acts as a recovery buffer. From the client device's perspective, once a write is acknowledged (i.e., safely logged to the flash-based storage device), it is guaranteed to persist. This allows the storage system to acknowledge writes quickly-immediately after storing them in the flash-based storage device-without waiting for slower flushes to long-term storage.

In some embodiments, upon restart, the storage system scans the header portion of the region. For example, if both Header 0 and Header 1 are present and appear valid, the system reads the metadata from Header 0, which indicates a 12 KB record at offset 0 KB, and from Header 1, which indicates a 4 KB record at offset 12 KB. The system then reads the data portion at the corresponding offsets and computes checksums for validation. The checksum for the second record matches the value stored in Header 1, confirming that the second record was completely and correctly written. However, the checksum for the first record does not match, indicating that the first record was only partially written and is therefore incomplete.

As a result, the system considers the first record invalid and identifies the last confirmed valid record for that file as the one preceding the first record, if any. In some embodiments, the storage system enforces strict ordering within the write-ahead log. If the first record is invalid, all subsequent records in the header portion may also be deemed invalid. In some embodiments, strict ordering is enforced only within each individual file's log. Thus, even if the second record was correctly written and validated, it may be discarded if it belongs to the same file as the invalid first record, in order to maintain consistency. Alternatively, if the two records belong to different files, the second record may still be considered valid and eligible for replay or reflush, while the first record is discarded.

Example Computer System

Figure 10:
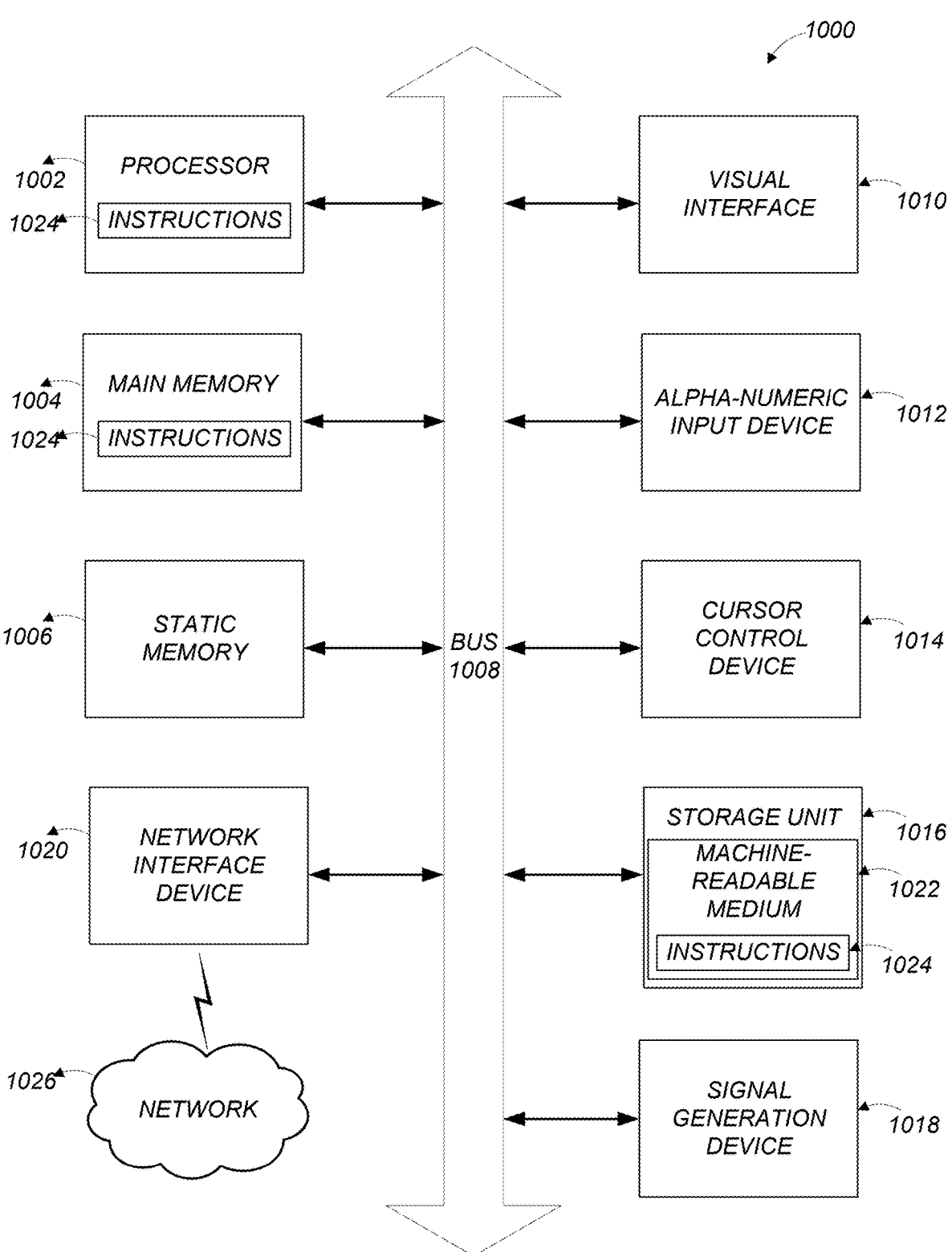
FIG. 10 is a block diagram illustrating components of an example machine able to read instructions from a machine-readable medium and execute them in a processor (or controller), in accordance with one or more embodiments.

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processors 1002 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 1004, and a static memory 1006, which are configured to communicate with each other via a bus 1008. The computer system 1000 may further include visual display interface 1010. The visual interface may include a software driver that enables (or provide) user interfaces to render on a screen either directly or indirectly. The visual interface 1010 may interface with a touch enabled screen. The computer system 1000 may also include input devices 1012 (e.g., a keyboard a mouse), a cursor control device 1014, a storage unit 1016, a signal generation device 1018 (e.g., a microphone and/or speaker), and a network interface device 1020, which also are configured to communicate via the bus 1008. The network interface device 1020 enables the system 1000 to communicate with other devices via a network 1026.

The storage unit 1016 includes a machine-readable medium 1022 (e.g., magnetic disk or solid-state memory) on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:

dividing a logical address space of a flash-based non-volatile storage device into a plurality of regions, wherein each region corresponds to one or more erase blocks of the flash-based non-volatile storage device;

for each region, allocating a header portion for storing one or more fixed-sized record headers associated with one or more write operations, and a data portion for storing one or more variable-length records associated with the one or more write operations;

receiving a plurality of write operations associated with a plurality of records;

temporarily storing the plurality of records associated with the plurality of write operations in a region of the plurality of regions in the flash-based non-volatile storage device;

flushing the plurality of records from the flash-based non-volatile storage device into a long term non-volatile storage device;

determining whether all records stored in the region of the flash-based non-volatile storage device are obsolete;

in response to determining that all records stored in the region of the flash-based non-volatile storage device are obsolete, issue a TRIM command to the flash-based non-volatile storage device; and erasing all data in the region, by a flash translation layer of the flash-based non-volatile storage device based on the TRIM command.

2. The computer-implemented method of claim 1, wherein temporarily storing the plurality of write operations in the flash-based non-volatile storage device comprising:

in response to receiving a first write operation associated with a first record, selecting a first header location in the header portion of a current region;

allocating a first data location in the data portion of the current region;

writing, in the first header location, metadata including a size of the first record; and writing, in the first data location in the data portion, the first record; and in response to receiving a second write operation associated with a second record before writing of the first record completes, selecting a second header location in the header portion of a current region;

allocating a second data location in the data portion of the current region based on the size of the first record written in the first header location;

writing, in the second header location, metadata including a size of the second record; and writing, in the second data location, the second record before writing of the first record in the first data location completes, such that writing of the first record in the first data location and writing of the second record in the second data location are partially overlapping in time.

3. The computer-implemented method of claim 1, wherein the plurality of regions form a circular log, such that a last region and a first region are logically connected to each other.

4. The computer-implemented method of claim 3, further comprising:

determining that the last region in the circular log is full;

erasing the first region in the circular log; and selecting the first region for logging the plurality of write operations.

5. The computer-implemented method of claim 3, further comprising:

in response to determining that one or more regions in the plurality of regions are full, storing a next record associated with a next write operation in a next region of the plurality of regions in the circular log, the next region sequentially following the one or more regions in the circular log and being not full.

6. The computer-implemented method of claim 5, further comprising:

determining that the last region is full;

determining whether all records in the first region are obsolete;

in response to determining that all records in the first region are obsolete, issuing a first TRIM command to the flash-based non-volatile storage device; and erasing all data in the first region, by the flash translation layer of the flash-based non-volatile storage device based on the first TRIM command.

7. The computer-implemented method of claim 6, wherein determining whether all records in the first region are obsolete includes receiving one or more confirmations from the long term non-volatile storage device, indicating that all records within the first region have been successfully flushed to the long term non-volatile storage device.

8. The computer-implemented method of claim 1, further comprising:

in response to completely writing a record associated with a write operation in the flash-based non-volatile storage device, sending a confirmation to a client device associated with the write operation, acknowledging that the write operation is successful.

9. The computer-implemented method of claim 8, further comprising:

detecting a power outage at the long term non-volatile storage device before a record has been flushed from the flash-based non-volatile storage device to the long term non-volatile storage device; and in response to recovering from the power outage, re-flushing the record from the flash-based non-volatile storage device to the long term non-volatile storage device.

10. The computer-implemented method of claim 8, wherein the flash-based non-volatile storage device is a solid state drive (SSD).

11. A non-transitory computer-readable storage medium storing instructions that when executed by one or more computer processors, cause the one or more computer processors to perform steps comprising:

dividing a logical address space of a flash-based non-volatile storage device into a plurality of regions, wherein each region corresponds to one or more erase blocks of the flash-based non-volatile storage device;

for each region, allocating a header portion for storing one or more fixed-sized record headers associated with one or more write operations, and a data portion for storing one or more variable-length records associated with the one or more write operations;

receiving a plurality of write operations associated with a plurality of records;

temporarily storing the plurality of records associated with the plurality of write operations in a region of the plurality of regions in the flash-based non-volatile storage device;

flushing the plurality of records from the flash-based non-volatile storage device into a long term non-volatile storage device;

determining whether all records stored in the region of the flash-based non-volatile storage device are obsolete;

in response to determining that all records stored in the region of the flash-based non-volatile storage device are obsolete, issue a TRIM command to the flash-based non-volatile storage device; and erasing all data in the region, by a flash translation layer of the flash-based non-volatile storage device based on the TRIM command.

12. The non-transitory computer-readable storage medium of claim 11, wherein temporarily storing the plurality of write operations in the flash-based non-volatile storage device comprising:

in response to receiving a first write operation associated with a first record, selecting a first header location in the header portion of a current region;

allocating a first data location in the data portion of the current region;

writing, in the first header location, metadata including a size of the first record; and writing, in the first data location in the data portion, the first record; and in response to receiving a second write operation associated with a second record before writing of the first record completes, selecting a second header location in the header portion of a current region;

allocating a second data location in the data portion of the current region based on the size of the first record written in the first header location;

writing, in the second header location, metadata including a size of the second record; and writing, in the second data location, the second record before writing of the first record in the first data location completes, such that writing of the first record in the first data location and writing of the second record in the second data location are partially overlapping in time.

13. The non-transitory computer-readable storage medium of claim 11, wherein the plurality of regions form a circular log, such that a last region and a first region are logically connected to each other.

14. The non-transitory computer-readable storage medium of claim 13, the steps further comprising:

determining that the last region in the circular log is full;

erasing the first region in the circular log; and selecting the first region for logging the plurality of write operations.

15. The non-transitory computer-readable storage medium of claim 13, the steps further comprising:

in response to determining that one or more regions in the plurality of regions are full, storing a next record associated with a next write operation in a next region of the plurality of regions in the circular log, the next region sequentially following the one or more regions in the circular log and being not full.

16. The non-transitory computer-readable storage medium of claim 15, the steps further comprising:

determining that the last region is full;

determining whether all records in the first region are obsolete;

in response to determining that all records in the first region are obsolete, issuing a first TRIM command to the flash-based non-volatile storage device; and erasing all data in the first region, by the flash translation layer of the flash-based non-volatile storage device based on the first TRIM command.

17. The non-transitory computer-readable storage medium of claim 16, wherein determining whether all records in the first region are obsolete includes receiving one or more confirmations from the long term non-volatile storage device, indicating that all records within the first region have been successfully flushed to the long term non-volatile storage device.

18. The non-transitory computer-readable storage medium of claim 11, the steps further comprising:

in response to completely writing a record associated with a write operation in the flash-based non-volatile storage device, sending a confirmation to a client device associated with the write operation, acknowledging that the write operation is successful.

19. The non-transitory computer-readable storage medium of claim 18, the steps further comprising:

detecting a power outage at the long term non-volatile storage device before a record has been flushed from the flash-based non-volatile storage device to the long term non-volatile storage device; and in response to recovering from the power outage, re-flushing the record from the flash-based non-volatile storage device to the long term non-volatile storage device.

20. A computing system comprising:

one or more computer processors; and a non-transitory computer readable storage medium storing instructions that when executed by the one or more computer processors, cause the one or more computer processors to perform steps comprising computer-implemented method, comprising:

dividing a logical address space of a flash-based non-volatile storage device into a plurality of regions, wherein each region corresponds to one or more erase blocks of the flash-based non-volatile storage device;

for each region, allocating a header portion for storing one or more fixed-sized record headers associated with one or more write operations, and a data portion for storing one or more variable-length records associated with the one or more write operations;

receiving a plurality of write operations associated with a plurality of records;

temporarily storing the plurality of records associated with the plurality of write operations in a region of the plurality of regions in the flash-based non-volatile storage device;

flushing the plurality of records from the flash-based non-volatile storage device into a long term non-volatile storage device;

determining whether all records stored in the region of the flash-based non-volatile storage device are obsolete;

in response to determining that all records stored in the region of the flash-based non-volatile storage device are obsolete, issue a TRIM command to the flash-based non-volatile storage device; and erasing all data in the region, by a flash translation layer of the flash-based non-volatile storage device based on the TRIM command.

* * * * *